United States Patent
Graham (10) Patent No.: US 7,316,379 B1
(45) Date of Patent: Jan. 8, 2008

(54) ADJUSTABLE MOUNTING BRACKET FOR FLAT PANEL DISPLAY

(76) Inventor: Jonathan W. Graham, 1020 SE. 11th St., Fort Lauderdale, FL (US) 33316

( * ) Notice: Subject to any disclaimer, the term of this patent is extended or adjusted under 35 U.S.C. 154(b) by 142 days.

(21) Appl. No.: 11/200,327

(22) Filed: Aug. 9, 2005

(51) Int. Cl.
*A47F 5/00* (2006.01)
*A47G 1/24* (2006.01)

(52) U.S. Cl. .................. 248/298.1; 248/495

(58) Field of Classification Search ........... 248/298.1, 248/475.1, 489, 490, 495, 496, 292.14, 294.1, 248/918
See application file for complete search history.

(56) References Cited

U.S. PATENT DOCUMENTS

| | | | | |
|---|---|---|---|---|
| 2,791,388 A | * | 5/1957 | Raymond | 248/495 |
| 2,877,687 A | * | 3/1959 | Bozin | 248/477 |
| 2,943,831 A | * | 7/1960 | Goss | 248/495 |
| 2,975,994 A | * | 3/1961 | Goss | 248/496 |
| 6,068,227 A | | 5/2000 | Morgan et al. | |
| 6,418,010 B1 | | 7/2002 | Sawyer | |
| 6,554,242 B2 | * | 4/2003 | Kim | 248/371 |
| 6,559,829 B1 | * | 5/2003 | Matsuo et al. | 345/156 |
| 6,578,812 B2 | * | 6/2003 | Lemire | 248/551 |
| 6,585,203 B1 | | 7/2003 | Euker | |
| 6,604,722 B1 | * | 8/2003 | Tan | 248/276.1 |
| 6,659,418 B2 | * | 12/2003 | Lemire | 248/495 |
| 6,901,987 B1 | * | 6/2005 | Graham | 160/121.1 |
| 6,923,413 B2 | * | 8/2005 | Dozier | 248/294.1 |
| 7,070,156 B2 | * | 7/2006 | Liao | 248/466 |
| 7,175,146 B2 | * | 2/2007 | Kim | 248/279.1 |
| 7,178,775 B2 | * | 2/2007 | Pfister et al. | 248/292.14 |
| 2003/0201372 A1 | | 10/2003 | Dozier | |
| 2004/0211870 A1 | | 10/2004 | Bremmon et al. | |
| 2004/0245420 A1 | | 12/2004 | Pfister et al. | |

FOREIGN PATENT DOCUMENTS

JP        2000206901 A   *   7/2000

* cited by examiner

*Primary Examiner*—Anita M. King
(74) *Attorney, Agent, or Firm*—Dan Brown Law Office; Daniel R. Brown (57) ABSTRACT

A mounting bracket apparatus for adjustably supporting a flat panel display from a wall. The mounting bracket includes a wall bracket, a display bracket and two traversing mounts. The traversing mounts are supportively disposed between the wall bracket and the display bracket, and driven along a pair of substantially parallel linear axes by a pair of actuators enabling vertical adjustment of the display bracket. The traversing mounts are flexibly coupled between the wall bracket and the display bracket, thereby enabling misalignment of the positions to adjust the skew of the display bracket relative to the wall bracket.

13 Claims, 9 Drawing Sheets

ADJUSTABLE MOUNTING BRACKET FOR FLAT PANEL DISPLAY

BACKGROUND OF THE INVENTION

1. Field of the Invention

The present invention relates to mounting brackets. More specifically, the present invention relates to an adjustable mounting bracket for supporting a flat panel television or display from a wall or similar surface.

2. Description of the Related Art

Flat panel televisions and displays are becoming increasingly common and will gradually replace virtually all cathode ray tube televisions and displays. Flat panel televisions and displays are frequently hung on a wall in a fashion reminiscent of paintings and photographs because their structures are similar. Flat panel displays are large, heavy, and expensive, and therefore the process of mounting them to a vertical surface is daunting. Installers and users who do their own installation typically avoid repetitive mounting and dismounting of a flat panel display because of the difficulty of the task and the risk of damage involved.

Current flat panel display mounts include a wall plate and a display bracket. The wall plate is securely mounted to a wall, usually bolted into wall studs or other structural components able to bear the load of the display. The display bracket is bolted to the back of the flat panel display. There may be plural wall plates or plural display brackets used. After the display bracket is securely fastened to the back of the flat panel display, it is lifted into place, where the display bracket is hung from the wall plate. While this arrangement is straightforward, it does present certain problems in practical applications.

A flat panel display, like a photograph or picture, needs to be precisely positioned so that its appearance within the local environment is pleasing. Even a slight misalignment, tilt or skew will be obvious to the casual observer. In order for the alignment to be precise and level, the installer must determine the relationship between the wall plate and display bracket as well as the relationship between the display bracket and the outer periphery of the flat panel display itself. In addition, structural mounting fasteners, such as lag bolts, toggle bots, and expansion fasteners are not precise instruments by their very nature. The location of structural components in the wall may not be located in optimum positions. In the case where an installer is hired to do an installation, the end user may request a subtle adjustment after the installation is complete, even though the installation was positioned accurately in the first place. Making a subtle adjustment is a major undertaking with prior art mounts. Thus, there is a need in the art for a flat panel display mount and method that enables precise adjustment of position and tilt of a flat panel display to a wall or other vertical surface.

SUMMARY OF THE INVENTION

The need in the art is addressed by the apparatus of the present invention. A mounting bracket apparatus for adjustably supporting a flat panel display from a wall is taught. The mounting bracket includes a wall bracket, a display bracket and two traversing mounts. The first traversing mount is supportively disposed between the wall bracket and the display bracket, and driven along a first linear axis by a first actuator. The second traversing mount is also supportively disposed between the wall bracket and the display bracket, and driven along a second linear axis, oriented substantially parallel to the first linear axis, by a second actuator.

In a specific embodiment of the mounting bracket, the first traversing mount and the second traversing mount are flexibly coupled between the wall bracket and the display bracket, thereby enabling misalignment of the positions of the first traversing mount and the second traversing mounts to adjust the skew of the display bracket relative to the wall bracket. In another specific embodiment, the first traversing mount and the second traversing mount are flexibly coupled to enable rotation within a plane that is parallel to the wall on which the wall bracket is disposed. In another specific embodiment of the mounting bracket, the first traversing mount is flexibly connected to the first actuator and the second traversing mount is flexibly connected to the second actuator, thereby enabling misalignment of the positions of the first traversing mount and the second traversing mount to adjust the skew of the display bracket relative to the wall bracket.

In a specific embodiment of the mounting bracket, the first actuator and the second actuator are threaded rods that engage the first traversing mount and the second traversing mount, respectively. The threaded rods extend to a peripheral location on the mounting bracket, thereby enabling access for actuation thereof by a user. In another specific embodiment, the display bracket is configured as a first portion and a second portion that are independently supported, thereby enabling adjustment of their spacing adaptation to the mounting configuration of the flat panel display.

In a specific embodiment of the mounting bracket, the first traversing mount and the second traversing mount are removably disposed between the wall bracket and the display bracket. In a refinement, the mounting bracket also includes a horizontal mounting flange disposed to removably engage the first traversing mount and the second traversing mount, thereby enabling adjustment of the horizontal position of the display bracket relative to the wall bracket. In another refinement, the mounting bracket further includes a mount lock coupled to selectively lock the position of the display bracket to the wall bracket, and, the mount lock is selectively actuated by a lock actuator. In a further refinement, the mount lock is positioned to urge the first traversing mount and the second traversing mount against the horizontal mounting flange, thereby preventing disengagement there from. The lock actuator may be a threaded rod that engages the mount lock and extends to a peripheral location on the mounting bracket. The lock actuator may engage the first actuator or the second actuator.

The present invention also teaches a mounting bracket apparatus for adjustably supporting a flat panel display from a wall configured as follows. A wall bracket has a first horizontal flange aligned in parallel with a second horizontal flange. A first display bracket has a first traversing mount driven along a first linear axis and engaged with a first threaded rod actuator that extends to a peripheral location on the mounting bracket. The first traversing mount has a curved extension formed to supportively engage the first horizontal flange and enable rotation of the first display bracket along a plane parallel to the wall on which the wall bracket is mounted. The first display bracket further includes a first mount lock slidably positioned along the first threaded rod actuator and aligned to be urged against the second horizontal flange by a first lock actuator that is concentric to and engaged with the first threaded rod, and that extends to a peripheral location on the mounting bracket. The mounting bracket also includes a second display bracket that has a second traversing mount driven along a second linear axis and engaged with a second threaded rod actuator that extends to a peripheral location on the mounting bracket. The second traversing mount has a curved extension formed to supportively engage the first horizontal flange and enable rotation of the second display bracket along the plane parallel to the wall on which the wall bracket is mounted. The second display bracket further includes a second mount lock slidably positioned along the second threaded rod actuator that is aligned to be urged against the second horizontal flange by a second lock actuator that is concentric to and engaged with the second threaded rod, and that extends to a peripheral location on the mounting bracket. The first display bracket and the second display bracket are independently positionable along the first horizontal flange, thereby enabling adjustment of the horizontal position of the flat panel display, and further enabling adjustment of the spacing between the first display bracket and the second display bracket to allow adaptation to the mounting configuration of the flat panel display.

The present invention also teaches a mounting bracket for adjustably supporting a flat panel display from a wall that is configured as follows. A wall bracket rotatably supports a first threaded rod and a second thread rod that are in a generally vertical orientation and substantially parallel to one another. A traversing mount has a flexibly supported first coupler engaged to be driven by rotation of the first threaded rod, and a flexibly supported second coupler engaged to be driven by rotation of the second threaded rod. The traversing mount has a horizontal flange. A first display bracket has a first mounting lip for selective engagement along the horizontal flange, and, a second display bracket has a second mounting lip for selective engagement along the horizontal flange.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention advances the art of mounting flat panel displays, such as plasmas and LCD televisions and video monitors, by teaching mounting bracket apparatus that enable adjustment of the mounted position of such displays vertically, horizontally and skew. The apparatus include wall brackets and display brackets. In use, the wall brackets are solidly attached to a wall, or other generally vertical surface, and the display brackets are attached to the back of a flat panel display. The display is supported by the wall when the wall brackets and display brackets are coupled together, typically using a flange and hanging clip or hook combination. A pair of traversing mounts is provided between the wall brackets and display brackets, which enable adjustment of the display position while the flat panel display is supported from the wall. If the traversing mounts are adjusted in synchronous, the display position is vertically adjusted. If the traversing mounts are adjusted in opposite directions, the display skew position is adjusted. Infinite combinations of movement and adjustment are thereby realized. The horizontal position of the display is adjusted by moving the hanging clips laterally along the mounting flange. This approach greatly simplifies the "fine tuning" adjustments that are frequently required when a flat panel display is installed. The actuators for the traversing mounts extend to a common edge along the periphery of the mounting bracket, thereby providing convenient access after the flat panel display has been installed. Adjustments are made using common hand tools, such as wrenches, screwdrivers, and other driving tools.

Figure 1:
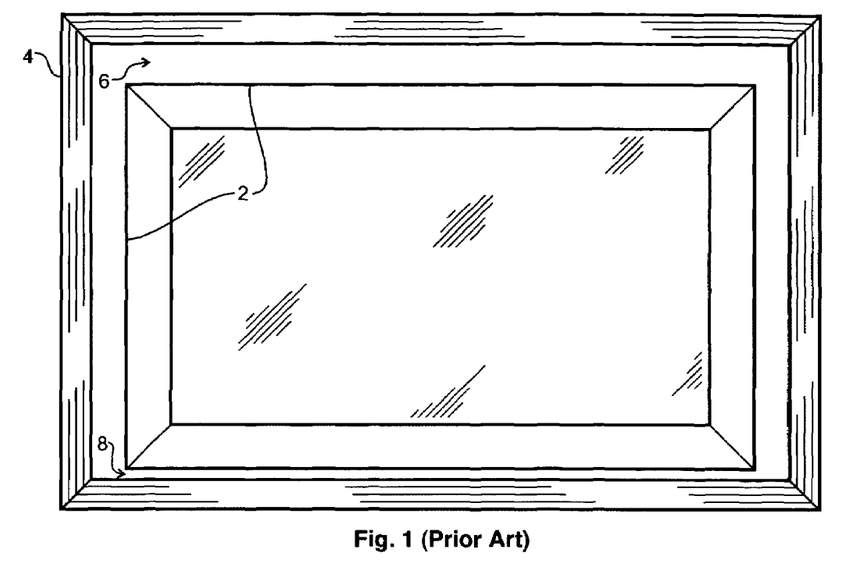
FIG. 1 is a prior art installation drawing of a flat panel display.
Figure 2:
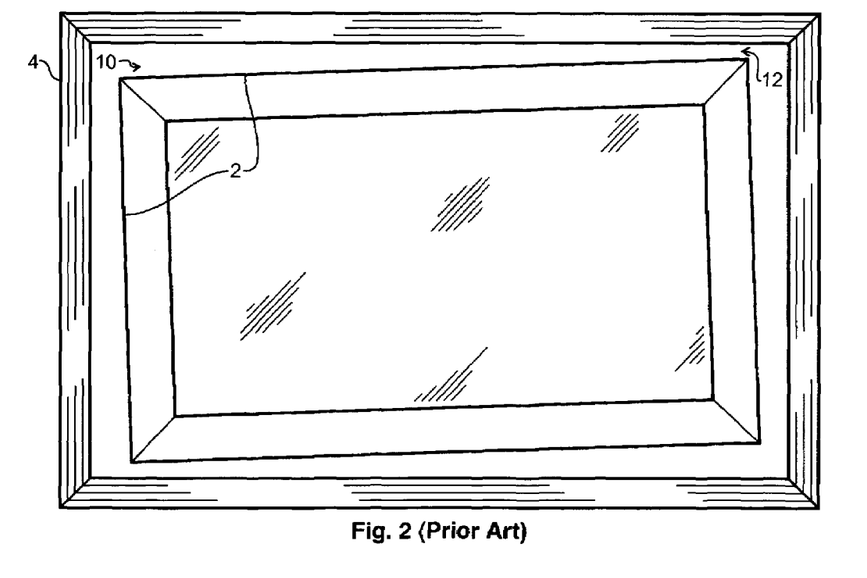
FIG. 2 is a prior art installation drawing of a flat panel display.

Reference is directed to FIG. 1 and FIG. 2, which are prior art installation drawings for flat panel displays. A flat panel display 2 is mounted within a framed opening 4. The use of a framed opening and concealment of flat panel displays is presented in U.S. Pat. No. 6,901,987 to Graham for Furled Decorative Covering Apparatus and Method, also the inventor of the present invention. In addition to framed openings, flat panel displays are frequently aligned adjacent to objects that provide a visual queue as to orientation, such as the top of a mantle, wall seam, corner, adjacent wall hanging, and etc. The human eye is very sensitive to spatial misalignment. In FIG. 1, the display 2 is vertically misaligned, as the upper gap 6 is wider than the lower gap 8, which is quite noticeable to the casual observer. This misalignment occurs because of the rather coarse initial positioning of the wall bracket (not shown). FIG. 2 illustrates the problem of skew misalignment in a display, where the upper-left gap 10 is larger than the upper-right gap 12, which is also readily apparent to the casual observer. The correction of skewed misalignment requires rotation of the display and mount about a plane lying in parallel to the plane of the wall or other mounting surface. In the prior art, the solution to these kinds of misalignment was to remove the display from the mounting bracket, attempt to remove and re-mount the wall bracket, then re-hang the display. Re-mounted is a time consuming and often times frustrating process as the re-mounting process frequently revealed another misalignment of the mounted display.

Figure 3:
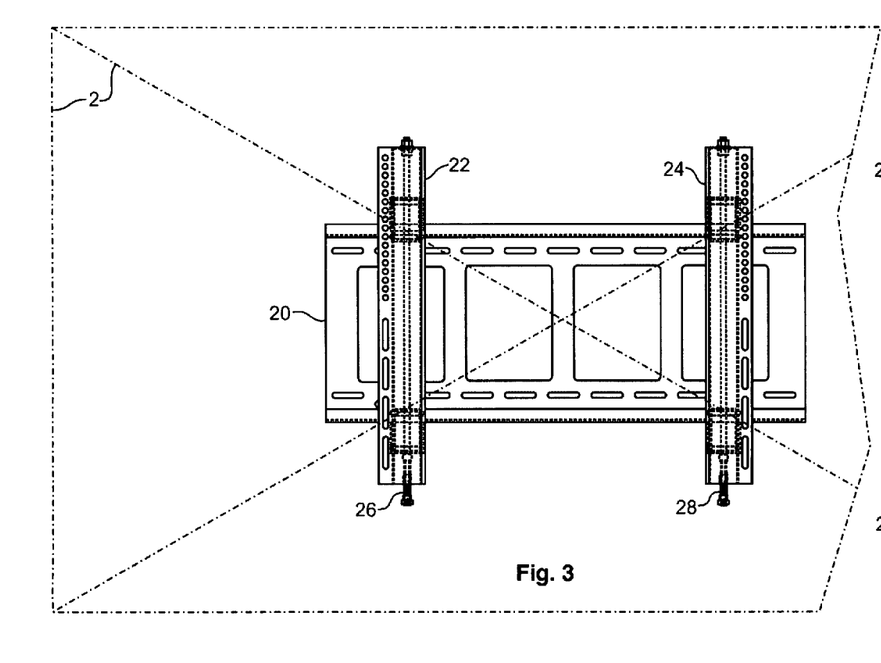
FIG. 3 is a front view drawing of an adjustable mounting bracket according to an illustrative embodiment of the present invention.
Figure 4:
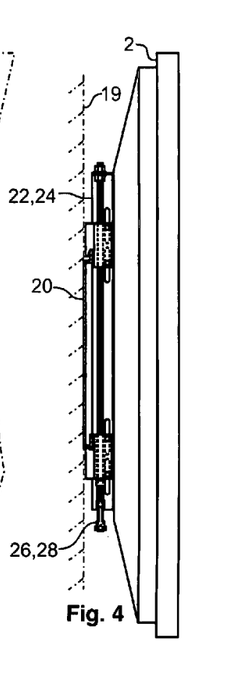
FIG. 4 is a side view drawing of an adjustable mounting bracket according to an illustrative embodiment of the present invention.
Figure 5:
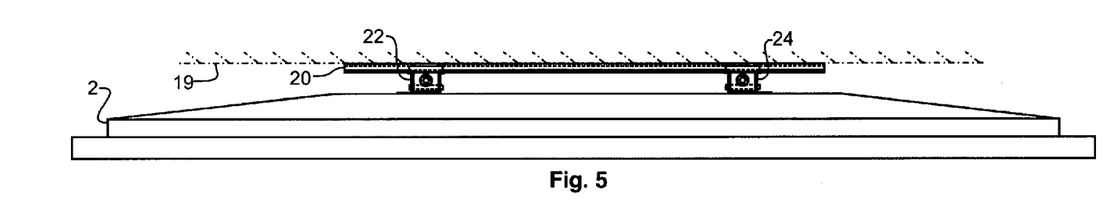
FIG. 5 is a top view drawing of an adjustable mounting bracket according to an illustrative embodiment of the present invention.

Reference is directed to FIG. 3, FIG. 4, and FIG. 5, which are front view, side view, and top view drawing, respectively, of an adjustable mounting bracket according to an illustrative embodiment of the present invention. The mounting bracket includes a wall bracket 20 that is rigidly attached to a wall surface 19, typically using screws, lag bolts, toggle fasteners, or expansion anchors depending on the type wall construction involved. A first display bracket 22 and a second display bracket 24, both of which include a traversing mount with actuators 26, 28 are attached to the back of a flat panel display 2 using screws that fit existing mounting holes in the display 2. The display brackets 22, 24 are hung from the wall bracket 20 thereby supporting the display 2 from the wall 19. After installation, the display bracket actuators 26, 28 are rotated to actuate the traversing mounts, thereby independently adjusting the vertical position of both display brackets 22, 24 relative to the wall bracket 20. This arrangement enables an installer to mount the wall bracket 20 using a rather coarse approach to position and then hang the display 2. If there is any misalignment noticed, the actuators 26, 28 can be adjusted from beneath the display 2 using a suitable tool, all without having to remove the display from its hung position, hence the problem in the prior art is overcome.

Figure 6:
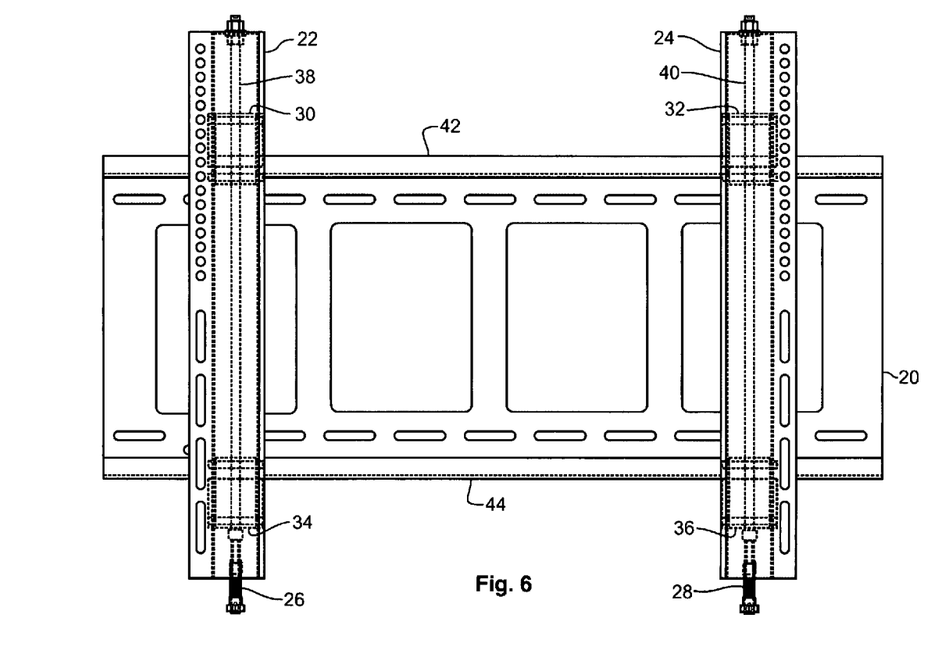
FIG. 6 is a front view of an adjustable mounting bracket according to an illustrative embodiment of the present invention.
Figure 7:
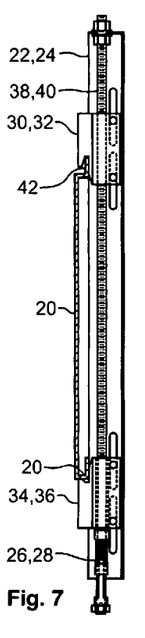
FIG. 7 is a side section view of an adjustable mounting bracket according to an illustrative embodiment of the present invention.
Figure 8:
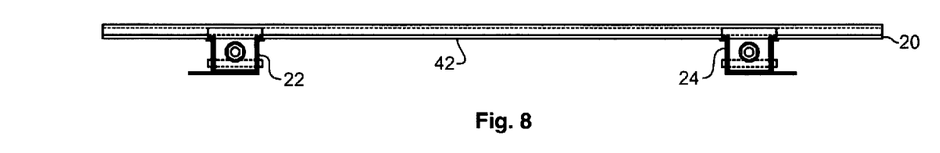
FIG. 8 is a top view of an adjustable mounting bracket according to an illustrative embodiment of the present invention.

Reference is directed to FIG. 6, FIG. 7 and FIG. 8, which are front view, side view, and end view drawings, respectively, of the adjustable mounting bracket according to an illustrative embodiment of the present invention. These figures are a more detailed view of the aforementioned mounting bracket. The wall bracket 20 is shown, which includes an upper horizontal flange 42 and a lower horizontal flange 44. The first display bracket 22 is supported from the upper horizontal flange 42 by a first traversing mount 30. The first traversing mount 30 is held is position along a vertical axis of travel by a first threaded rod actuator 38, which threadably engages the first traversing mount 30. A first lock mount 34 is slidably positioned along the first threaded rod 38, and is urged against the lower horizontal flange 44 of the wall mount 20 by first actuator 26, which will be more fully discussed hereinafter. The second display bracket 24 is supported from the upper horizontal flange 42 by a second traversing mount 32. The second traversing mount 32 is held in position along a vertical axis of travel by a second threaded rod actuator 40, which threadably engages the second traversing mount 32. A second lock mount 36 is slidably positioned along the second threaded rod 40, and is urged against the lower horizontal flange 44 of the wall mount 20 by second actuator 28, which will be more fully discussed hereinafter. The first and second lock mounts 34, 36 are urged against the lower horizontal flange 44 of the wall bracket 20 after the position of the display is adjusted via the threaded rods 38, 40 and the first and second traversing mounts 30, 32. This action binds the traversing mount 30, 32 and the mount locks against the wall bracket 20, thereby locking the position of the display brackets 22, 24 relative to the wall mount 20. The first and second actuators 26, 28 include adjustments for the position of both the traversing mounts 30, 32 and both mount locks 34, 36, which will be more fully discussed hereinafter.

Figure 9:
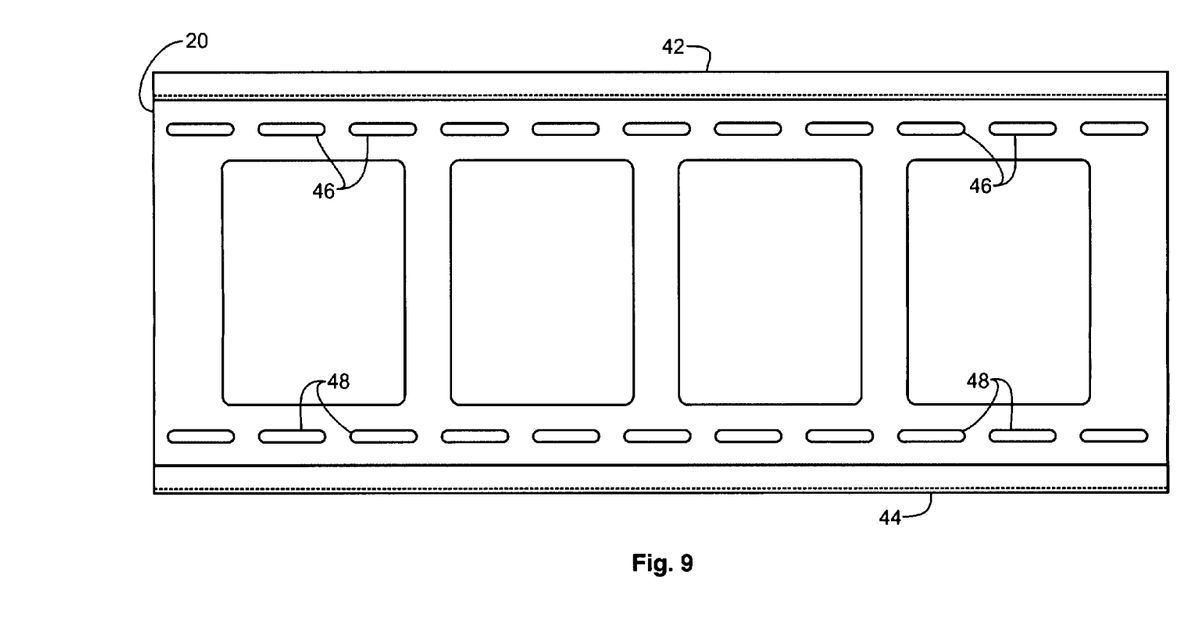
FIG. 9 is a front view drawing of a wall plate according to an illustrative embodiment of the present invention.
Figure 10:
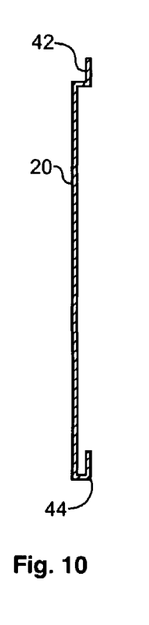
FIG. 10 is a side view drawing of a wall plate according to an illustrative embodiment of the present invention.
Figure 11:
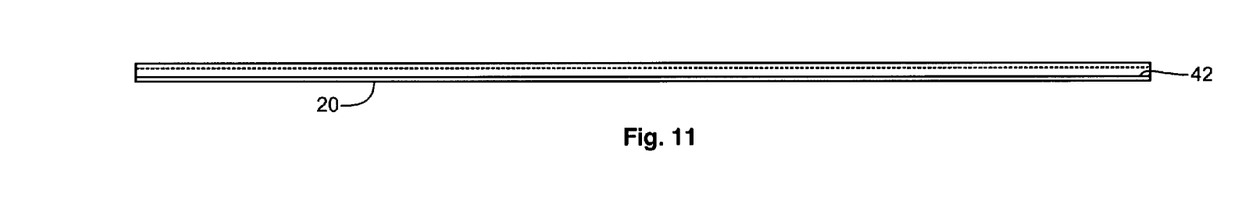
FIG. 11 is a top view drawing of a wall plate according to an illustrative embodiment of the present invention.

Reference is directed to FIG. 9, FIG. 10 and FIG. 11, which are front view, side view and top view drawings, respectively, of the wall bracket according to an illustrative embodiment of the present invention. The wall bracket 20 is formed from flat plate that is bent to form an upper horizontal flange 42 and a lower horizontal flange 44. A first row of slotted holes 46 and a second row of slotted holes 48 are punched along the upper and lower portions of the plate to facilitate mounting the wall bracket to a wall. The rows of slotted holes enable flexible positioning of the wall bracket to a variety of wall construction environments. Larger holes are punched in the central area of the wall bracket to reduce weight through removal of unneeded material. The design of the illustrative embodiment wall bracket achieves low cost through simplicity of design.

Figure 12:
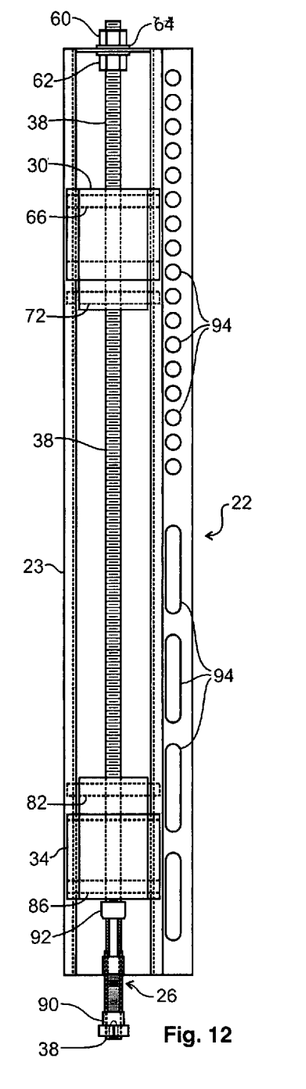
FIG. 12 is a front view drawing of an adjustable display bracket according to an illustrative embodiment of the present invention.
Figures 13, 14, 15:
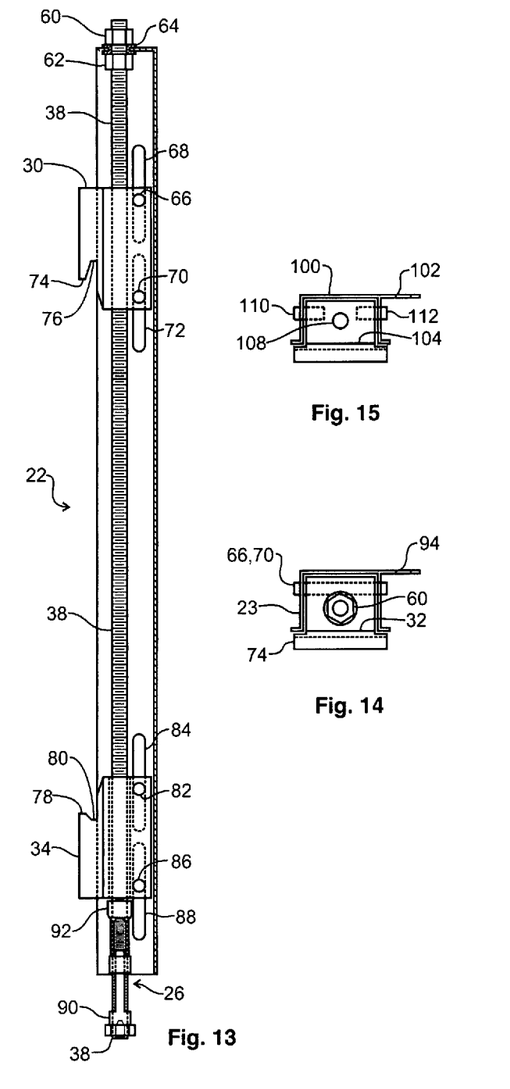
FIG. 13 is a side view drawing of an adjustable display bracket according to an illustrative embodiment of the present invention.
FIG. 14 is a top view drawing of an adjustable display bracket according to an illustrative embodiment of the present invention.
FIG. 15 is a top view drawing of an adjustable display bracket according to an illustrative embodiment of the present invention.
Figure 16:
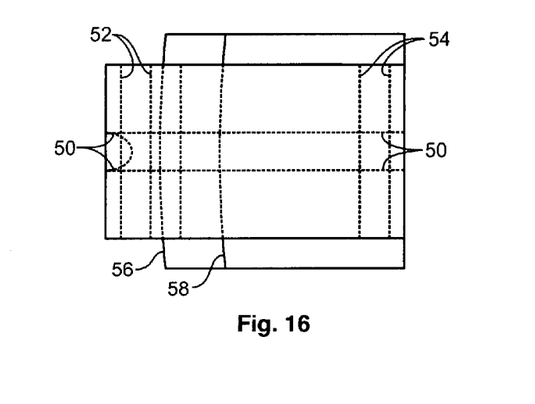
FIG. 16 is a back view drawing of a traversing mount according to an illustrative embodiment of the present invention.
Figure 17:
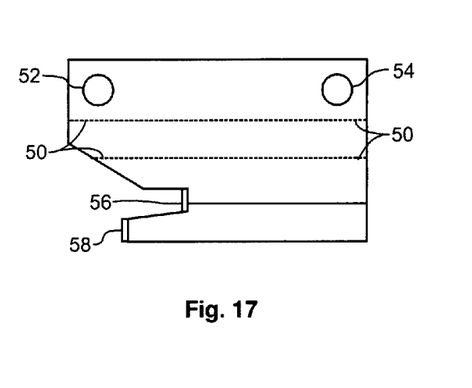
FIG. 17 is a side view drawing of a traversing mount according to an illustrative embodiment of the present invention.
Figure 18:
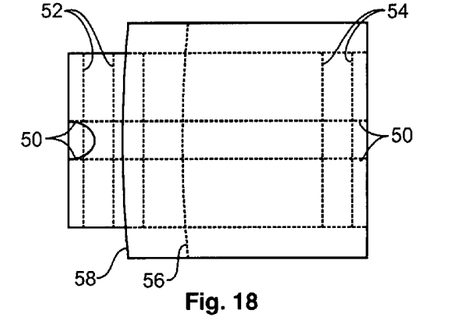
FIG. 18 is a front view drawing of a traversing mount according to an illustrative embodiment of the present invention.
Figure 19:
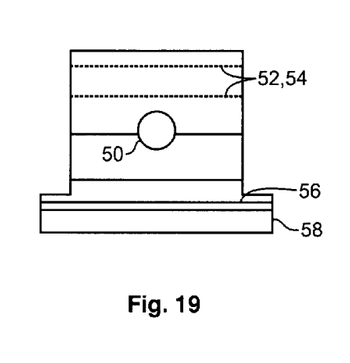
FIG. 19 is a bottom view drawing of a traversing mount according to an illustrative embodiment of the present invention.

Reference is directed to FIG. 12, FIG. 13, and FIG. 14, which are front view, side section view, and top view drawings, respectively, of the first adjustable display bracket 22 according to an illustrative embodiment of the present invention. The second adjustable display bracket 24 is a similar structure, reflected about the vertical axis as compared to the first display bracket. Display bracket 22 is formed as a 'C' channel with a flange extending from one edge, which is punched with plural mounting holes and slots 94. The plural mounting holes and slots 94 facilitate the attachment of the display bracket 22 to a variety of flat panel display mounting hole patterns, as are known to those skilled in the art. Each side of the 'C' channel shape 23 is punched with an upper pair of slots 68, 72 and a lower pair of slots 84, 88, which acts as guides for the traversing mount 30 and mount lock 34 along their respective vertical axis travel paths. The slots are approximately one and one-half inch long in the illustrative embodiment. Locating pins 66, 70 slidably engage the traversing mount slots 68, 70, and similar locating pins 82, 86 engage the mount lock slots 84, 88. This arrangement allows free vertical travel of the traversing mount 32 and the lock mount 34 within the one and one-half inch slot length. It has been empirically determined that one and one-half inches of travel is sufficient flexibility for a typical coarsely positioned wall bracket, to enable precise alignment of the installed display. Other degrees of travel can be employed in alternative embodiments, depending on the application of the invention involved.

The threaded rod 38 is supported near the central vertical axis of the 'C' channel 23 using a pair of nuts 60, 62 that are rotatably joined to the 'C' channel using a thermoplastic bushing 62. The nuts 60, 64 are crimped or otherwise seized to the threaded rod 38 to prevent rotation relative thereto. Thusly, the threaded rod 38 is free to rotate while being held in vertical alignment within the channel 23. The traversing mount 32 has a hole bored through its vertical axis that is threaded to engage the threaded rod 38. Therefore, rotation of the threaded rod 38 causes the traversing mount 32 to travel up and down the threaded rod along the vertical axis of the display bracket 22. The traversing mount 32 has a hook 74 and recess 76 that are configured to engage the upper horizontal flange of the wall bracket (not shown). Thusly, the traversing mount 32 hangs from the upper horizontal flange of the wall bracket and supports the flat panel display, while being adjustable along its vertical axis. The mount lock also has a hook 78 and recess 80, which may engage the lower horizontal flange on the wall mount (not shown). In an illustrative embodiment, the traversing mount and mount lock have identical hooks, 74, 78 and recesses 76, 80, such that the entire display bracket can be mounted upside down, thereby enabling adjustment access from an upper peripheral location of the mounting bracket.

The mount lock 34 has a hole bored through its vertical axis, however, the hole is oversize as compared to the threaded rod 38, so that the mount lock 34 is free to slide up and down relative to the threaded rod 38 and the channel 23. The travel of the mount lock 34 is limited by the locating pins 82, 86 and the slots 84, 86. Normally, the mount lock rest by gravity against the lock follower 92 portion at the upper end of the actuator assembly 26. When the lock bolt 90 at the lower end of the actuator assembly 26 is rotated, the lock follower, which is threadably engaged to the threaded rod 38, is driven to urge the mount lock 34 against the lower horizontal flange (not shown) of the wall bracket (not shown). Counter rotation of the lock bolt 90 releases the mount lock by lowering it away from the flange. The actuator assembly 26 thereby controls the position of both the traversing mount 32 through rotation of the threaded rod, and the mount lock 34 from a peripheral location, the bottom, of the bracket assembly. The actuator assembly will be more fully discussed hereinafter.

Reference is directed to FIG. 15, which is a top view drawing of an adjustable display bracket according to an alternative embodiment of the present invention. The embodiment in FIG. 15 is similar to that in FIG. 14, except for a few notable distinctions. In FIG. 15, the 'C' channel 100 with the mounting flange 102 is shallower. This is possible because the traversing mount 104 with the threaded rod 108 passing there through is also shallower. This is possible because the locating pins 110, 112 do not pass all the way through the traversing mount 104. Note that in FIG. 14, the locator pins 66, 70 pass all the way through so that there must be sufficient depth of the traversing mount 32 to accommodate both the threaded rod bore and the locator pin bores. In FIG. 15, such clearance is not required so the depth of the traversing mount 104 can be shallower.

Reference is directed to FIG. 16, FIG. 17, FIG. 18, and FIG. 19, which are back view, side view, front view, and bottom view drawings, respectively, of a traversing mount and a mount lock according to an illustrative embodiment of the present invention. In this embodiment, the traversing mount and the mount lock are identical, except that the central bore 50 is threaded to engage the threaded rod in the case of a traversing mount, and, the central bore 50 is oversized to slide along the length of the threaded rod in the case of a mount lock. For the remainder of this description, the block will be referred to as the traversing mount. Two holes 52, 54 are formed laterally through the traversing mount to engage the aforementioned locator pins. A recess 56 is formed to engage the flanges on the aforementioned wall bracket, which is guided into position by the hook extension 58. The surfaces of the block leading to the recess 56 and hook 58 are tapered to guide the hook and recess into the proper location when they are positioned onto the flange. Note that the surface of the hook 58 and recess 56 are arcuate. This allows the display bracket to rotate within a plane parallel to the plane of the wall on which the mounting bracket is mounted so that the skew of the display can be corrected. The arcuate surfaces provide smooth and contiguous contact about a few degrees of rotation within that plane. The present invention generally contemplates some degree of flexibility in the connection between the traversing mount and the display bracket or the wall bracket, depending upon the configuration of the structure. This is to allow for the skew adjustment of the installed flat panel display. The skew adjustment occurs when the two traversing mounts are positioned at different points along their vertical travel, and thus requires some degree of flexibility in the connections.

Figure 20:
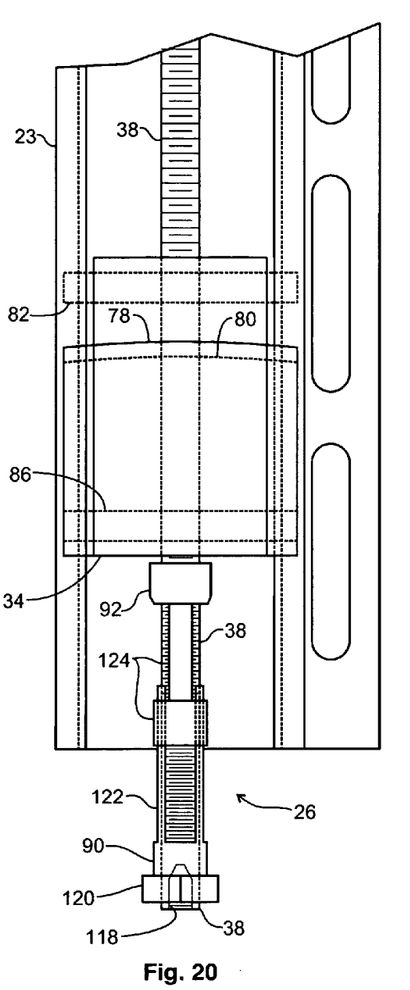
FIG. 20 is a front view detail of a traversing lock according to an illustrative embodiment of the present invention.
Figure 21:
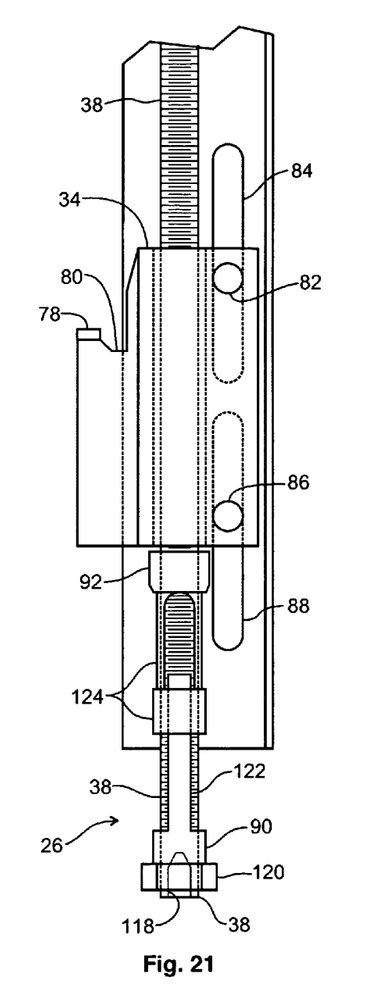
FIG. 21 is a side section view detail of a traversing lock according to an illustrative embodiment of the present invention.

Reference is directed to FIG. 20 and FIG. 21, which are a front view detail and a side section view drawing, respectively, of the mount lock 34 and actuator 26 according to an illustrative embodiment of the present invention. The display bracket channel 23 guides the mount lock 34 along its vertical axis, which is retained in position by the threaded rod 38 and the locator pins 82, 86 as they traverse the mount lock slots 84, 88. The threaded rod 38 does not threadably engage the mount lock 34 central bore, enabling the mount lock to slide freely. The lower extreme of the threaded rod 38 has a Torx socket 118 formed therein for engaging a Torx wrench (not shown), which is used as the tool to rotate the threaded rod 38, thereby adjusting the position of the traversing lock, as described herein before. The Torx socket 118 is a first portion of the actuator 26 function. The second portion of the actuator function adjusts the position of the mount lock 34.

The second portion of the actuator 26 function is accomplished through use of a lock bolt 90 that slideably engages a lock follower 92. The lock bolt 90 is retained on the end of the treaded rod 38 using a snap-ring (not shown), which engages an annular groove (not shown) in the threaded rod 38. The snap ring allows the lock bolt 90 to rotate relative to the threaded rod 38, while preventing the lock bolt 90 from moving up or down the vertical axis of the threaded bold 38. The lock bolt has a hex nut 120 at its lower end, which is used to engage a hex wrench (not shown) that us used to rotate the lock bolt 90 during adjustment operations by a user. The lock bolt 90 has a pair of drive tongs 122 that extend upwardly and engage a corresponding pair of driven tongs 124 on the lock follower 92. Note that the lock bolt 90 and drive tongs 122 are free to rotate on the threaded rod 38 without engaging the threads. The inside diameter of the lock follower 92 is threadably engaged to the threaded rod 38. Thusly, when the driven tongs 124 are forced to rotate through engagement with the drive tongs 122, the lock follower rotates with respect to the threaded rod 38, urging the lock follower against the mount lock 34. The vertical movement of the lock follower 92 is isolated from the fixed position of the lock bolt 90 through the slideable engagement of the drive tongs 122 and the driven tongs 124. With this arrangement, the Torx socket 118 and the hex nut 120 provide the points of input for actuating the traversing mount and mount lock, respectively. These are located at a convenient access position about the periphery of the mounting bracket assembly.

Figure 22:
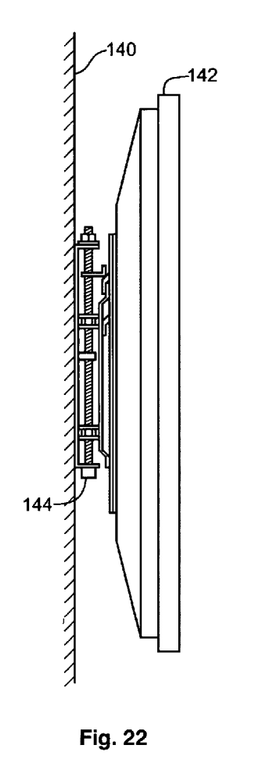
FIG. 22 is a side view installation drawing of an adjustable mounting bracket according to an illustrative embodiment of the present invention.
Figure 23:
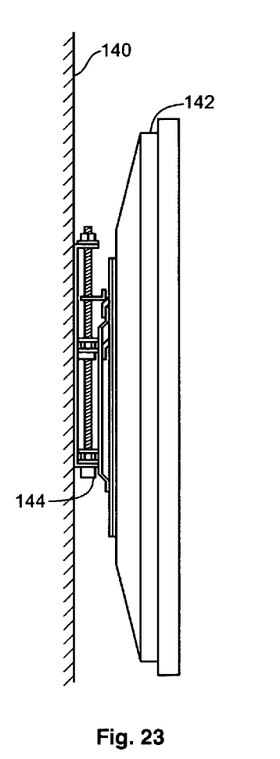
FIG. 23 is a side view installation drawing of an adjustable mounting bracket according to an illustrative embodiment of the present invention.
Figure 24:
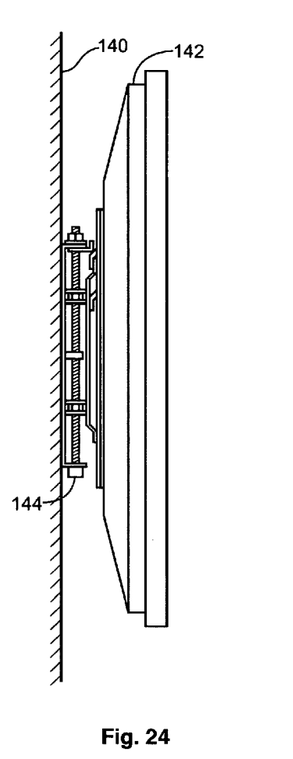
FIG. 24 is a side view installation drawing of an adjustable mounting bracket according to an illustrative embodiment of the present invention.

Reference is directed to FIG. 22, FIG. 23, and FIG. 24, which are side view installation drawings of an adjustable mounting bracket according to an illustrative embodiment of the present invention. FIG. 22 shows a flat panel display 142 positioned in the center of the range of travel of the illustrative embodiment mounting bracket 144 and attached to a vertical wall surface 140. FIG. 23 shows the same display 142 at the lower limited of the mounting bracket 144 travel. FIG. 24 shows the same display 142 at the upper limit of the mounting bracket 144 travel. The illustrative embodiment mounting bracket 144 differs somewhat from the previous embodiment, however it shares several essential features of the invention. These include a wall bracket portion, a display bracket portion, a pair of traversing mounts, and a mount lock feature.

Figure 25:
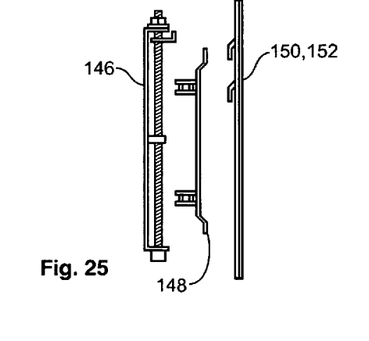
FIG. 25 is an exploded diagram of an adjustable mounting bracket according to an illustrative embodiment of the present invention.

Reference is directed to FIG. 25, which is an exploded diagram of the adjustable mounting bracket according to the illustrative embodiment of the present invention illustrated in FIG. 22. In FIG. 25 the wall bracket 146 is shown separated from the traversing mount plate 148 and a pair of display brackets 150, 152. Each of these elements will be more fully described in the subsequent drawing figures and corresponding descriptions.

Figures 26, 27:
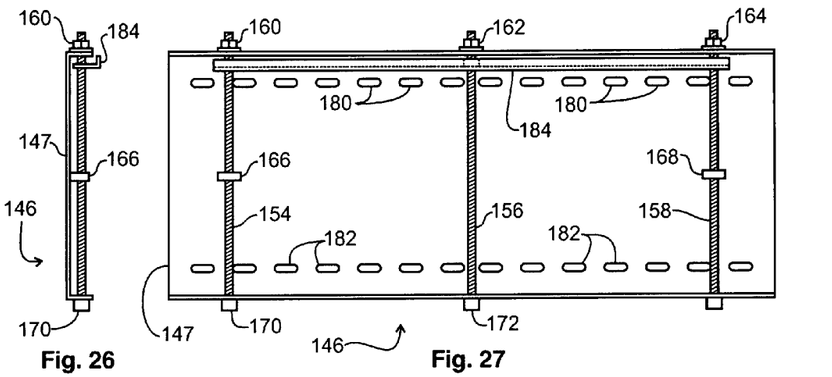
FIG. 26 is a side view drawing of a wall plate according to an illustrative embodiment of the present invention.
FIG. 27 is a front view drawing of a wall plate according to an illustrative embodiment of the present invention.

Reference is directed to FIG. 26 and FIG. 27, which are a side view and front view drawing, respectively, of a wall bracket 146 according to an illustrative embodiment of the present invention. The wall bracket 146 includes of a wall plate 147 that is essentially a large 'C' channel form. A first row of slotted holes 180 along the upper edge of the channel 147 and a second row of slotted holes 182 along the lower edge of the channel 147 are provided to enable flexible mounting to a wall or other vertical surface. A pair of traversing mount actuators 154, 158, which are threaded rods in the illustrative embodiment, are rotatably supported from the flanges of the 'C' channel shape. At the upper end of the threaded rods 154, 158 is a nut and plastic washer 160, 164. The nuts 160, 164 are cinched or otherwise seized to the threaded rods 154, 158 to prevent rotation with respect thereto. There are a pair center rod supports 166, 168, which rotatably supports the respective threaded rods 154, 158, thereby providing additional support. The lower end of each threaded rod 154, 158, which are rotatably supported by the lower flange of the channel 147, is a Torx head socket used to engage a tool to rotate each of the threaded rods 154, 158, thereby enabling actuation of the traversing mounts, discussed hereinafter.

The wall bracket 146 further includes a mount lock actuator 156, which is another threaded rod rotatably supported by the channel 147. The mount lock actuator 156 is also rotatably supported and retained by a cinched nut and plastic washer 162 at the upper end, in the same fashion as the traversing mount actuators. At the lower end of the mount lock actuator 156 is a Torx socket 172, which engages a tool used to actuate the actuator. Thus, is can be seen that all of the actuators 154, 156, 158 are accessed from a lower peripheral location on the mounting bracket. The mount lock actuator threaded rod 156 threadably engages a lock bar 184 such that rotation of the actuator 156 causes the lock bar 184 to travel up and down the actuator threaded rod 156. The lock bar 184 extends across the width of the channel 147 and reaches at least as for as the two traversing mount actuators 154, 158. The lock bar has a pair of holes formed therein through which the traversing mount actuators 154, 158 freely pass. This arrangement retains the lock bar 184 against rotation as the mount lock actuator 156 is actuated, and also insures that the lock bar 184 is urged against the display bracket hooks, thereby locking the display brackets to the wall brackets, which will be more fully discussed hereinafter. A traversing mount plate is an integral part of the wall bracket in the illustrative embodiment.

Figure 28:
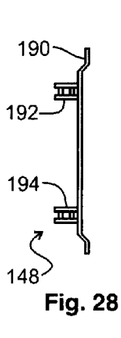
FIG. 28 is a side view drawing of a traversing mount according to an illustrative embodiment of the present invention.
Figure 29:
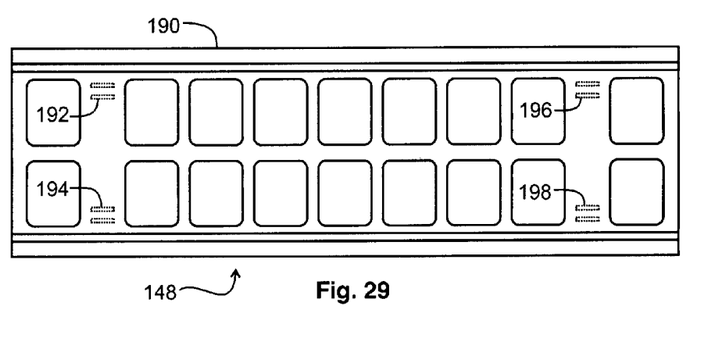
FIG. 29 is a front view drawing of a traversing mount according to an illustrative embodiment of the present invention.

Reference is directed to FIG. 28 and FIG. 29, which are a side view drawing and a front view drawing, respectively, of a traversing mount plate 148 according to an illustrative embodiment of the present invention. The traversing mount plate 148 includes a horizontal upper flange 190 that supportably engages the display brackets, discussed hereinafter. The traversing mount plate 148 includes four traversing mount brackets 192, 194, 196, and 198 that are rigidly affixed thereto. The traversing mount brackets flexibly retain four corresponding nuts (illustrated in the side view of FIG. 28) that threadably engage the traversing mount actuator threaded rods 154, 158. As such, when the thread rod are rotated, the nuts flexibly retained in the traversing mount brackets 192, 194, 196 and 198 are driven up or down the threaded rods 154, 158. There are two nuts threaded to each rod, as illustrated. The flexible retention of the nuts in the corresponding brackets 192, 194, 196, and 198 allow for vertical misalignment of the traversing mounts, which corrects for skew misalignment in the mounted flat panel display. The nuts are retain against rotation with respect to the rotating threaded rod, but are flexible in rotation with respect to the vertical plane parallel to the wall on which the mount bracket is mounted. The assembled view of FIG. 30 provides further clarification of the assembled mounting bracket.

Figure 30:
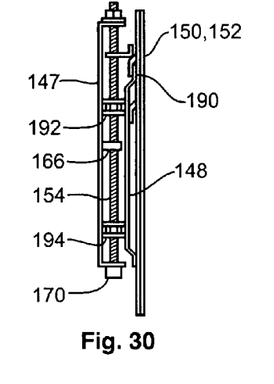
FIG. 30 is an assembled view of an adjustable mounting bracket according to an illustrative embodiment of the present invention.

Reference is directed to FIG. 30, which is a side view of the assembled adjustable mounting bracket 144 according to the illustrative embodiment of the present invention. The wall plate channel 147 rotatably supports the threaded rod traversing mount actuator 154 and provides actuation access to the Torx socket 170 located on the lower periphery of the mount 144. A pair of the traversing mount brackets 192, 194 flexibly retain their corresponding nuts, which are flexibly supported within the brackets 192, 194. Thusly, as the Torx socket 170 is actuated, the threaded rod 154 turns and drives the traversing mounts 192, 194 and mount plate 148 up and down the vertical axis. A pair of display brackets 150, 152 are hung from and supported by the upper horizontal flange 190 of the mount plate 148.

Figure 31:
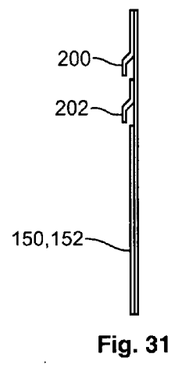
FIG. 31 is a side view drawing of a display bracket according to an illustrative embodiment of the present invention.
Figure 32:
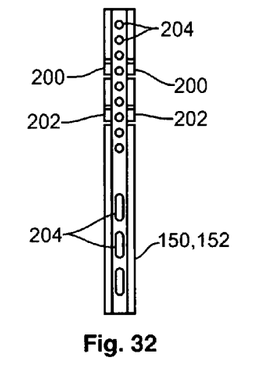
FIG. 32 is a front view drawing of a display bracket according to an illustrative embodiment of the present invention.

Reference is directed to FIG. 31 and FIG. 32, which are a side view drawing and front view drawing, respectively, the display brackets 150, 152 according to the illustrative embodiment of the present invention. In this embodiment, two independent display brackets 150, 152 are provided so that they may be independently positioned along the upper horizontal flange 190 of the mount plate 148. This arrangement allows for adaptation to displays with varying mount hole locations and for adjustment of the horizontal position of the mounted display. The display brackets 150, 152 include a row of holes and slots 204 that enable connection to various flat panel displays. There is also a pair of mount plate hooks 200, 202 on each display bracket. The pair of hooks 200 and 202 provide for a coarse adjustment in vertical position. Either hook 200, 202 can be employed to engage the upper horizontal flange 190 on the mount plate 148.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A mounting bracket apparatus for adjustably supporting a flat panel display from a wall, comprising:
   a wall bracket;
   a display bracket;
   a first traversing mount supportively disposed between said wall bracket and said display bracket, and driven along a first linear axis by a first actuator, and
   a second traversing mount supportively disposed between said wall bracket and said display bracket, and driven along a second linear axis, oriented substantially parallel to said first linear axis, by a second actuator, and wherein
   said first traversing mount and said second traversing mount are flexibly coupled between said wall bracket and said display bracket, thereby enabling misalignment of the positions of said first traversing mount and said second traversing mounts to adjust the skew of said display bracket relative to said wall bracket.

2. The apparatus of claim 1 wherein said first traversing mount and said second traversing mount are flexibly coupled to enable rotation within a plane that is parallel to the wall on which said wall bracket is disposed.

3. The apparatus of claim 1 wherein said first traversing mount is flexibly connected to said first actuator and said second traversing mount is flexibly connected to said second actuator, thereby enabling misalignment of the positions of said first traversing mount and said second traversing mount to adjust the skew of said display bracket relative to said wall bracket.

4. The apparatus of claim 1 wherein said first actuator and said second actuator are threaded rods that engage said first traversing mount and said second traversing mount, respectively, and extend to a peripheral location about said wall bracket, thereby enabling access for actuation thereof.

5. The apparatus of claim 1 wherein said display bracket comprises a first portion and a second portion that are independently supported, thereby enabling adjustment of the spacing there between for adaptation to the mounting configuration of the flat panel display.

6. The apparatus of claim 1 wherein said first traversing mount and said second traversing mount are removably disposed between said wall bracket and said display bracket.

7. The apparatus of claim 6 further comprising:
   a horizontal mounting flange disposed to removably engage said first traversing mount and said second traversing mount, thereby enabling adjustment of the horizontal position of said display bracket relative to said wall bracket.

8. The apparatus of claim 7, further comprising:
   a mount lock coupled to selectively lock the position of said display bracket to said wall bracket, said mount lock selectively actuated by a lock actuator.

9. The apparatus of claim 8 wherein said mount lock is positioned to urge said first traversing mount and said second traversing mount against said horizontal mounting flange, thereby preventing disengagement there from.

10. The apparatus of claim 8 wherein said lock actuator is a threaded rod that engages said mount lock and extends to a peripheral location about said wall bracket.

11. The apparatus of claim 8 wherein said lock actuator engages one of said first actuator or said second actuator.

12. A mounting bracket apparatus for adjustably supporting a flat panel display from a wall, comprising:
   a wall bracket having a first horizontal flange aligned in parallel with a second horizontal flange;
   a first display bracket having a first traversing mount driven along a first linear axis and engaged with a first threaded rod actuator that extends to a peripheral location about said wall bracket, said first traversing mount having a curved extension formed to supportively engage said first horizontal flange and enable rotation of said first display bracket along a plane parallel to the wall on which the wall bracket is mounted, and wherein
   said first display bracket further comprising a first mount lock slidably positioned along said first threaded rod actuator and aligned to be urged against said second horizontal flange by a first lock actuator that is concentric to and engaged with said first threaded rod actuator, and that extends to a peripheral location on the mounting bracket;
   a second display bracket having a second traversing mount driven along a second linear axis and engaged with a second threaded rod actuator that extends to a peripheral location on the mounting bracket, said second traversing mount having a curved extension formed to supportively engage said first horizontal flange and enable rotation of said second display bracket along said plane parallel to the wall on which the wall bracket is mounted, and wherein said second display bracket further comprising a second mount lock slidably positioned along said second threaded rod actuator and aligned to be urged against said second horizontal flange by a second lock actuator that is concentric to and engaged with said second threaded rod actuator, and that extends to a peripheral location on the mounting bracket, and wherein said first display bracket and said second display bracket are independently positionable along said first horizontal flange, thereby enabling adjustment of the horizontal position of the flat panel display, and further enabling adjustment of the spacing between said first display bracket and said second display bracket to allow adaptation to the mounting configuration of the flat panel display.

13. A mounting bracket apparatus for adjustably supporting a flat panel display form a wall, comprising:

a wall bracket rotatably supporting a first threaded rod and a second tread rod in a generally vertical orientation and substantially parallel to one another;

a traversing amount having a flexibly supported first coupler engaged to be driven by rotation of said first threaded rod, and a flexibly supported second coupler engaged to be driven by rotation of said second threaded rod, said traversing mount having a horizontal flange;

a first display bracket having a first mounting lip for selective engagement along said horizontal flange, and a second display bracket having a second mounting lip for selective engagement along said horizontal flange.

* * * * *